United States Patent
McGuire, Jr. et al.

(10) Patent No.: US 8,329,079 B2
(45) Date of Patent: Dec. 11, 2012

(54) METHOD AND APPARATUS FOR CONTINUOUS PRODUCTION OF PARTIALLY POLYMERIZED COMPOSITIONS AND POLYMERS THEREFROM

(75) Inventors: James E. McGuire, Jr., Westerville, OH (US); Andrew C. Strange, Worthington, OH (US); Daniel E. Lamone, Dublin, OH (US)

(73) Assignee: entrochem, inc., Columbus, OH (US)

( * ) Notice: Subject to any disclaimer, the term of this patent is extended or adjusted under 35 U.S.C. 154(b) by 733 days.

(21) Appl. No.: 12/426,666

(22) Filed: Apr. 20, 2009

(65) Prior Publication Data
US 2010/0267855 A1    Oct. 21, 2010

(51) Int. Cl.
C08J 3/28 (2006.01)
C08F 2/46 (2006.01)
B01J 19/22 (2006.01)
B01J 19/08 (2006.01)

(52) U.S. Cl. ........... 264/172.19; 264/165; 264/171.13; 264/405; 264/425; 264/494; 264/495; 522/150; 522/153; 522/154; 522/157; 522/161; 522/178; 522/181; 422/131; 422/300; 422/311; 422/186; 422/186.3; 422/187

(58) Field of Classification Search ........... 522/150, 522/153, 154, 157, 161, 170, 178, 181; 264/165, 264/171.13, 172.19, 405, 425, 494, 495; 422/131, 310, 311, 186, 186.3, 187
See application file for complete search history.

(56) References Cited

U.S. PATENT DOCUMENTS

| | | |
|---|---|---|
| 3,154,141 A | 10/1964 | Huet |
| 3,310,600 A | 3/1967 | Ziegler et al. |
| 3,399,227 A | 8/1968 | Tapulionis |
| 3,628,918 A | 12/1971 | Beals et al. |
| 3,728,085 A | 4/1973 | Horiguchi et al. |
| 3,776,947 A | 12/1973 | Shimizu et al. |
| 3,816,267 A | 6/1974 | Chuang |
| 3,821,330 A | 6/1974 | Free |
| 3,914,290 A | 10/1975 | Otsuki et al. |
| 4,009,195 A | 2/1977 | Leister et al. |
| 4,016,348 A | 4/1977 | Adams |

(Continued)

FOREIGN PATENT DOCUMENTS
DE    880938    6/1953
(Continued)

OTHER PUBLICATIONS

United States Occupational Safety & Health Administration, "Chemical Sampling Information: 2-Ethylhexyl acrylate," [online—retrieved Dec. 17, 2009 from http://www.osha.gov/dts/chemicalsampling/data/CH_240533.html]; Jun. 16, 1995.

*Primary Examiner* — Sanza McClendon
(74) *Attorney, Agent, or Firm* — The Griffith Law Firm, A.P.C.; Lisa M. Griffith

(57) ABSTRACT

Methods and apparatus for continuous production of a partially polymerized composition according to the invention comprise those that facilitate continuously providing polymerizable composition comprising one or more monomers to an angled plane at an elevated position thereon; irradiating the polymerizable composition to form the partially polymerized composition; and continuously removing the partially polymerized composition from the angled plane at a lower position thereon, wherein the angle of the angled plane facilitates free flow of polymerizing composition from the elevated position to the lower position.

30 Claims, 6 Drawing Sheets

U.S. PATENT DOCUMENTS

| | | | |
|---|---|---|---|
| 4,046,718 A | 9/1977 | Mass et al. | |
| 4,089,918 A | 5/1978 | Kato et al. | |
| 4,110,521 A | 8/1978 | Barnett et al. | |
| 4,153,774 A | 5/1979 | Boettcher et al. | |
| 4,173,719 A * | 11/1979 | Tauber et al. | 250/310 |
| 4,181,752 A | 1/1980 | Martens et al. | |
| 4,200,145 A | 4/1980 | Underwood | |
| 4,233,267 A | 11/1980 | Coker et al. | |
| 4,258,204 A | 3/1981 | Banks et al. | |
| 4,280,009 A | 7/1981 | Erpenbach et al. | |
| 4,280,010 A | 7/1981 | Erpenbach et al. | |
| 4,287,317 A | 9/1981 | Kitagawa et al. | |
| 4,303,485 A | 12/1981 | Levins | |
| 4,329,384 A | 5/1982 | Vesley et al. | |
| 4,330,590 A | 5/1982 | Vesley | |
| 4,364,972 A | 12/1982 | Moon | |
| 4,379,201 A | 4/1983 | Heilmann et al. | |
| 4,383,093 A | 5/1983 | Shiraki et al. | |
| 4,391,687 A | 7/1983 | Vesley | |
| 4,395,525 A | 7/1983 | Fischer et al. | |
| 4,396,675 A | 8/1983 | Groff | |
| 4,402,914 A | 9/1983 | Eckhoff | |
| 4,404,246 A | 9/1983 | Charbonneau et al. | |
| 4,415,615 A | 11/1983 | Esmay et al. | |
| 4,421,822 A | 12/1983 | Levens | |
| 4,455,205 A | 6/1984 | Olson et al. | |
| 4,478,876 A | 10/1984 | Chung | |
| 4,480,116 A | 10/1984 | Clonce et al. | |
| 4,513,039 A | 4/1985 | Esmay | |
| 4,522,870 A | 6/1985 | Esmay | |
| 4,554,324 A | 11/1985 | Husman et al. | |
| 4,557,960 A | 12/1985 | Vernon et al. | |
| 4,563,388 A | 1/1986 | Bonk et al. | |
| RE32,249 E | 9/1986 | Esmay | |
| 4,617,367 A | 10/1986 | Watanabe et al. | |
| 4,619,867 A | 10/1986 | Charbonneau et al. | |
| 4,619,979 A | 10/1986 | Kotnour et al. | |
| 4,695,608 A | 9/1987 | Engler et al. | |
| 4,699,843 A | 10/1987 | Charbonneau et al. | |
| 4,731,273 A | 3/1988 | Bork et al. | |
| 4,737,559 A | 4/1988 | Kellen et al. | |
| 4,748,061 A | 5/1988 | Vesley | |
| 4,766,023 A | 8/1988 | Lu | |
| 4,777,230 A | 10/1988 | Kamath | |
| 4,810,523 A | 3/1989 | William et al. | |
| 4,818,610 A | 4/1989 | Zimmerman et al. | |
| 4,840,756 A * | 6/1989 | Ebersole et al. | 264/485 |
| 4,843,134 A | 6/1989 | Kotnour et al. | |
| 4,847,137 A | 7/1989 | Kellen et al. | |
| 4,931,347 A | 6/1990 | Slovinsky et al. | |
| 4,942,001 A | 7/1990 | Murphy et al. | |
| 4,950,537 A | 8/1990 | Vesley et al. | |
| 4,959,265 A | 9/1990 | Wood et al. | |
| 4,968,558 A | 11/1990 | Fisher et al. | |
| 4,985,488 A | 1/1991 | Landin | |
| 4,985,562 A | 1/1991 | Rossman et al. | |
| 4,988,742 A | 1/1991 | Moon et al. | |
| 4,996,029 A | 2/1991 | Martin et al. | |
| 5,009,224 A | 4/1991 | Cole | |
| 5,024,880 A | 6/1991 | Veasley et al. | |
| 5,028,484 A | 7/1991 | Martin | |
| 5,034,526 A | 7/1991 | Bonham et al. | |
| 5,057,366 A | 10/1991 | Husman et al. | |
| 5,089,536 A | 2/1992 | Palazzotto | |
| 5,102,715 A | 4/1992 | Zetterquist | |
| 5,106,560 A * | 4/1992 | Duffy et al. | 264/144 |
| 5,135,981 A | 8/1992 | Matsumaru et al. | |
| 5,147,698 A | 9/1992 | Cole | |
| 5,147,938 A | 9/1992 | Kuller | |
| 5,153,323 A | 10/1992 | Rossman et al. | |
| 5,183,833 A | 2/1993 | Fisher et al. | |
| 5,187,045 A | 2/1993 | Bonham et al. | |
| 5,188,808 A | 2/1993 | Lilja et al. | |
| 5,202,361 A | 4/1993 | Zimmerman et al. | |
| 5,236,560 A | 8/1993 | Drysdale et al. | |
| 5,237,355 A | 8/1993 | Kiehne et al. | |
| 5,266,402 A | 11/1993 | Delgado et al. | |
| 5,286,601 A | 2/1994 | Rossman et al. | |
| 5,308,887 A | 5/1994 | Ko et al. | |
| 5,344,691 A | 9/1994 | Hanschen et al. | |
| 5,354,597 A | 10/1994 | Capik et al. | |
| 5,354,600 A | 10/1994 | Fisher et al. | |
| 5,371,560 A | 12/1994 | Kiehne et al. | |
| 5,385,772 A | 1/1995 | Slovinsky et al. | |
| 5,386,052 A | 1/1995 | Sakakura et al. | |
| 5,387,682 A | 2/1995 | Bonham et al. | |
| 5,391,406 A | 2/1995 | Ramharack et al. | |
| 5,407,717 A | 4/1995 | Lucast et al. | |
| 5,416,127 A | 5/1995 | Chandran et al. | |
| 5,458,983 A | 10/1995 | Wang et al. | |
| 5,462,797 A | 10/1995 | Williams et al. | |
| 5,462,977 A | 10/1995 | Yoshikawa et al. | |
| 5,464,659 A | 11/1995 | Melancon et al. | |
| 5,468,821 A | 11/1995 | Lucast et al. | |
| 5,496,504 A | 3/1996 | Bonham et al. | |
| 5,501,679 A | 3/1996 | Krueger et al. | |
| 5,514,730 A | 5/1996 | Mazurek et al. | |
| 5,521,227 A | 5/1996 | Palazotto et al. | |
| 5,521,229 A | 5/1996 | Lu et al. | |
| 5,527,595 A | 6/1996 | Slovinsky et al. | |
| 5,536,759 A | 7/1996 | Ramharack et al. | |
| 5,559,163 A | 9/1996 | Dawson et al. | |
| 5,568,210 A | 10/1996 | Kiehne et al. | |
| 5,589,246 A | 12/1996 | Calhoun et al. | |
| 5,593,795 A | 1/1997 | Chen et al. | |
| 5,602,221 A | 2/1997 | Bennett et al. | |
| 5,616,670 A | 4/1997 | Bennett et al. | |
| 5,620,795 A | 4/1997 | Haak et al. | |
| 5,623,000 A | 4/1997 | Yoshikawa et al. | |
| 5,624,763 A | 4/1997 | Melancon et al. | |
| 5,624,973 A | 4/1997 | Lu et al. | |
| 5,637,395 A | 6/1997 | Uemura et al. | |
| 5,637,646 A | 6/1997 | Ellis | |
| 5,641,544 A | 6/1997 | Melancon et al. | |
| 5,643,648 A | 7/1997 | Kobe et al. | |
| 5,643,668 A | 7/1997 | Calhoun et al. | |
| 5,650,215 A | 7/1997 | Mazurek et al. | |
| 5,654,387 A | 8/1997 | Bennett et al. | |
| 5,658,630 A | 8/1997 | Shizukuda et al. | |
| 5,660,925 A | 8/1997 | Cooley et al. | |
| 5,667,893 A | 9/1997 | Kinzer et al. | |
| 5,670,260 A | 9/1997 | Zajaczkowski et al. | |
| 5,670,557 A | 9/1997 | Dietz et al. | |
| 5,674,561 A | 10/1997 | Dietz et al. | |
| 5,679,756 A | 10/1997 | Zhu et al. | |
| 5,683,798 A | 11/1997 | Bennett et al. | |
| 5,686,504 A | 11/1997 | Ang | |
| 5,691,034 A | 11/1997 | Krueger et al. | |
| 5,695,837 A | 12/1997 | Everaerts et al. | |
| 5,702,771 A | 12/1997 | Shipston et al. | |
| 5,708,109 A | 1/1998 | Bennett et al. | |
| 5,708,110 A | 1/1998 | Bennett et al. | |
| 5,710,227 A | 1/1998 | Freeman et al. | |
| 5,725,947 A | 3/1998 | Johannson et al. | |
| 5,726,258 A | 3/1998 | Fischer et al. | |
| 5,728,502 A | 3/1998 | Ou-Yang et al. | |
| 5,734,074 A | 3/1998 | Dockner et al. | |
| 5,741,542 A | 4/1998 | Williams et al. | |
| 5,741,543 A | 4/1998 | Winslow et al. | |
| 5,753,362 A | 5/1998 | Kawase et al. | |
| 5,753,768 A | 5/1998 | Ellis | |
| 5,756,584 A | 5/1998 | Bennett et al. | |
| 5,770,219 A | 6/1998 | Chiang et al. | |
| 5,773,485 A | 6/1998 | Bennett et al. | |
| 5,779,632 A | 7/1998 | Dietz et al. | |
| 5,800,685 A | 9/1998 | Perrault | |
| 5,804,610 A | 9/1998 | Hamer et al. | |
| 5,811,574 A | 9/1998 | Exner et al. | |
| 5,840,783 A | 11/1998 | Momchilovich et al. | |
| 5,848,769 A | 12/1998 | Fronek et al. | |
| 5,853,642 A | 12/1998 | Siedle et al. | |
| 5,853,750 A | 12/1998 | Dietz et al. | |
| 5,858,516 A | 1/1999 | Ou-Yang | |
| 5,859,088 A | 1/1999 | Peterson et al. | |
| 5,871,607 A | 2/1999 | Hamilton et al. | |
| 5,879,759 A | 3/1999 | Zang | |
| 5,883,149 A | 3/1999 | Bennett et al. | |

| Patent Number | Date | Inventor(s) |
|---|---|---|
| 5,883,288 A | 3/1999 | Iffland et al. |
| 5,900,125 A | 5/1999 | Exner et al. |
| 5,902,836 A | 5/1999 | Bennett et al. |
| 5,919,603 A | 7/1999 | Miyazaki et al. |
| 5,932,298 A | 8/1999 | Moon |
| 5,942,642 A | 8/1999 | Beyer et al. |
| 5,945,560 A | 8/1999 | Iffland et al. |
| 5,952,398 A | 9/1999 | Dietz et al. |
| 5,965,235 A | 10/1999 | McGuire et al. |
| 5,968,633 A | 10/1999 | Hamilton et al. |
| 5,969,069 A | 10/1999 | Su et al. |
| 5,976,690 A | 11/1999 | Williams et al. |
| 5,980,932 A | 11/1999 | Chiang et al. |
| 5,986,011 A | 11/1999 | Ellis |
| 6,015,603 A | 1/2000 | Ou-Yang |
| 6,030,701 A | 2/2000 | Johnson et al. |
| 6,034,263 A | 3/2000 | Rizzardo et al. |
| 6,037,430 A | 3/2000 | Chiang |
| 6,045,920 A | 4/2000 | Ou-Yang et al. |
| 6,072,076 A | 6/2000 | Schmidt et al. |
| 6,084,122 A | 7/2000 | Garza et al. |
| 6,099,940 A | 8/2000 | Hamilton et al. |
| 6,103,316 A | 8/2000 | Tran et al. |
| 6,123,890 A | 9/2000 | Mazurek et al. |
| 6,124,417 A | 9/2000 | Su |
| 6,126,865 A | 10/2000 | Haak et al. |
| 6,132,844 A | 10/2000 | Atshuler et al. |
| 6,148,496 A | 11/2000 | McGuire et al. |
| 6,149,935 A | 11/2000 | Chiang et al. |
| 6,150,486 A | 11/2000 | Schwede et al. |
| 6,159,557 A | 12/2000 | Meyer-Roscher et al. |
| 6,168,682 B1 | 1/2001 | Bennett et al. |
| 6,172,170 B1 | 1/2001 | Koniger et al. |
| 6,174,931 B1 | 1/2001 | Moon et al. |
| 6,177,190 B1 | 1/2001 | Gehlsen et al. |
| 6,187,127 B1 | 2/2001 | Bolitsky et al. |
| 6,193,918 B1 | 2/2001 | McGuire et al. |
| 6,194,062 B1 | 2/2001 | Hamilton et al. |
| 6,214,460 B1 | 4/2001 | Bluem et al. |
| 6,217,965 B1 | 4/2001 | Gelbart |
| 6,228,449 B1 | 5/2001 | Meyer |
| 6,232,365 B1 | 5/2001 | Weiss et al. |
| 6,241,928 B1 * | 6/2001 | Hatsuda et al. ............... 264/216 |
| 6,242,504 B1 | 6/2001 | Meyer-Roscher et al. |
| 6,245,922 B1 | 6/2001 | Heilmann et al. |
| 6,252,016 B1 | 6/2001 | Wu et al. |
| 6,254,965 B1 | 7/2001 | McGuire et al. |
| 6,262,329 B1 | 7/2001 | Brunsveld et al. |
| 6,280,822 B1 | 8/2001 | Smith et al. |
| 6,284,360 B1 | 9/2001 | Johnson et al. |
| 6,287,685 B1 | 9/2001 | Janssen et al. |
| 6,294,249 B1 | 9/2001 | Hamer et al. |
| 6,315,851 B1 | 11/2001 | Mazurek et al. |
| 6,316,099 B1 | 11/2001 | George et al. |
| 6,326,450 B1 | 12/2001 | Shipston et al. |
| 6,339,111 B1 | 1/2002 | Moon et al. |
| 6,340,719 B1 | 1/2002 | Goeb et al. |
| 6,348,249 B2 | 2/2002 | Meyer |
| 6,353,130 B1 | 3/2002 | Aichinger et al. |
| 6,372,827 B2 | 4/2002 | Johnson et al. |
| 6,383,958 B1 | 5/2002 | Swanson et al. |
| 6,399,031 B1 | 6/2002 | Herrmann et al. |
| 6,406,782 B2 | 6/2002 | Johnson et al. |
| 6,413,629 B1 | 7/2002 | Kimura |
| 6,414,087 B1 | 7/2002 | Hashemzadeh et al. |
| 6,416,838 B1 | 7/2002 | Arney et al. |
| 6,421,052 B1 | 7/2002 | McGuire |
| 6,436,529 B1 | 8/2002 | Deeb et al. |
| 6,436,532 B1 | 8/2002 | Moon et al. |
| 6,441,092 B1 | 8/2002 | Gieselman |
| 6,444,305 B2 | 9/2002 | Banovetz et al. |
| 6,448,301 B1 | 9/2002 | Gaddam et al. |
| 6,448,337 B1 | 9/2002 | Gaddam et al. |
| 6,448,339 B1 | 9/2002 | Tomita |
| 6,455,140 B1 | 9/2002 | Whitney et al. |
| 6,458,454 B1 | 10/2002 | Kreckel |
| 6,469,118 B1 | 10/2002 | Su |
| 6,475,609 B1 | 11/2002 | Whitney et al. |
| 6,485,589 B1 | 11/2002 | Johnson et al. |
| 6,489,022 B1 | 12/2002 | Hamilton et al. |
| 6,492,019 B1 | 12/2002 | Shipston et al. |
| 6,495,253 B1 | 12/2002 | Koyama et al. |
| 6,497,949 B1 | 12/2002 | Hyde et al. |
| 6,503,621 B1 | 1/2003 | Ma et al. |
| 6,513,897 B2 | 2/2003 | Tokie |
| 6,514,373 B1 | 2/2003 | Hill et al. |
| 6,517,661 B2 | 2/2003 | Hill, IV et al. |
| 6,517,910 B2 | 2/2003 | Wright et al. |
| 6,518,343 B1 | 2/2003 | Lucast et al. |
| 6,524,649 B1 | 2/2003 | Sher et al. |
| 6,537,659 B2 | 3/2003 | Karim et al. |
| 6,551,439 B1 | 4/2003 | Hill, IV et al. |
| 6,566,549 B1 | 5/2003 | Greenblatt et al. |
| 6,579,915 B2 | 6/2003 | Kroll et al. |
| 6,586,082 B1 | 7/2003 | Brown |
| 6,599,602 B2 | 7/2003 | Bennett et al. |
| 6,602,454 B2 | 8/2003 | McGuire et al. |
| 6,602,580 B1 | 8/2003 | Hamilton et al. |
| 6,605,738 B1 | 8/2003 | Ho et al. |
| 6,613,411 B2 | 9/2003 | Kollaja et al. |
| 6,624,273 B1 | 9/2003 | Everaerts et al. |
| 6,632,907 B1 | 10/2003 | Mizota et al. |
| 6,635,690 B2 | 10/2003 | Heilmann et al. |
| 6,649,787 B1 | 11/2003 | Nakahara et al. |
| 6,652,970 B1 | 11/2003 | Everaerts et al. |
| 6,656,307 B2 | 12/2003 | Northey |
| 6,664,306 B2 | 12/2003 | Gaddam et al. |
| 6,677,402 B2 | 1/2004 | Gaddam et al. |
| 6,689,853 B2 | 2/2004 | Campbell et al. |
| 6,740,399 B1 | 5/2004 | George et al. |
| 6,759,110 B1 | 7/2004 | Fleming et al. |
| 6,768,021 B2 | 7/2004 | Horan et al. |
| 6,773,647 B2 | 8/2004 | McGuire et al. |
| 6,800,278 B1 | 10/2004 | Perrault et al. |
| 6,803,072 B2 | 10/2004 | Sher et al. |
| 6,815,035 B2 | 11/2004 | Bennett et al. |
| 6,818,292 B2 | 11/2004 | Hamilton et al. |
| 6,825,278 B2 | 11/2004 | Holub et al. |
| 6,828,363 B2 | 12/2004 | Beuermann et al. |
| 6,838,142 B2 | 1/2005 | Yang et al. |
| 6,841,234 B2 | 1/2005 | Lhila et al. |
| 6,846,948 B2 | 1/2005 | Riondel et al. |
| 6,855,226 B2 | 2/2005 | Hill, IV et al. |
| 6,855,386 B1 | 2/2005 | Daniels et al. |
| 6,858,295 B2 | 2/2005 | Diehl et al. |
| 6,864,322 B2 | 3/2005 | Gehlsen et al. |
| 6,866,899 B2 | 3/2005 | Wright |
| 6,872,342 B2 | 3/2005 | Giachetto et al. |
| 6,878,440 B1 | 4/2005 | Yamanaka et al. |
| 6,881,471 B2 | 4/2005 | Toussant et al. |
| 6,883,908 B2 | 4/2005 | Young et al. |
| 6,893,655 B2 | 5/2005 | Flanigan et al. |
| 6,903,151 B2 | 6/2005 | Lucast et al. |
| 6,903,243 B1 | 6/2005 | Burton et al. |
| 6,906,164 B2 | 6/2005 | DeBruin |
| 6,911,243 B2 | 6/2005 | Sher et al. |
| 6,926,959 B2 | 8/2005 | Kroll et al. |
| 6,939,428 B2 | 9/2005 | Hill, IV et al. |
| 6,982,107 B1 | 1/2006 | Hennen |
| 7,015,286 B2 | 3/2006 | Heilmann et al. |
| 7,015,295 B2 | 3/2006 | Takizawa et al. |
| 7,056,984 B2 | 6/2006 | Kawabata et al. |
| 7,074,295 B2 | 7/2006 | Bellafore et al. |
| 7,074,858 B2 | 7/2006 | Heilmann et al. |
| 7,087,279 B2 | 8/2006 | Callahan et al. |
| 7,105,206 B2 | 9/2006 | Beck et al. |
| 7,119,128 B2 | 10/2006 | Husemann et al. |
| 7,182,829 B2 | 2/2007 | Smith et al. |
| 7,217,455 B2 | 5/2007 | Valdez |
| 7,229,517 B2 | 6/2007 | Bellafore et al. |
| 7,244,863 B2 | 7/2007 | Yada et al. |
| 7,250,210 B2 | 7/2007 | Mazurek et al. |
| 7,276,278 B2 | 10/2007 | Kamiyama et al. |
| 7,300,555 B2 | 11/2007 | Schroeder |
| 7,332,206 B2 | 2/2008 | Callahan et al. |
| 7,345,139 B2 | 3/2008 | DeBruin |
| 2001/0053814 A1 * | 12/2001 | Yamamoto et al. ............ 524/560 |
| 2002/0007030 A1 | 1/2002 | Brant |

| | | | | | | |
|---|---|---|---|---|---|---|
| 2002/0077509 | A1 | 6/2002 | Sugise et al. | DE | 10063510 | 7/2002 |
| 2003/0153699 | A1 | 8/2003 | Ameduri et al. | EP | 0795535 | 9/1997 |
| 2003/0199669 | A1 | 10/2003 | Saito et al. | EP | 0795536 | 9/1997 |
| 2004/0077744 | A1* | 4/2004 | Naylor et al. ............ 522/150 | EP | 0891990 | 1/1999 |
| 2004/0176561 | A1 | 9/2004 | Janeiro et al. | GB | 1352400 | 5/1974 |
| 2005/0107629 | A1 | 5/2005 | Hershberger et al. | GB | 2159826 | 12/1985 |
| 2006/0036047 | A1 | 2/2006 | Klostermann et al. | JP | 2001-106654 | 4/2001 |
| 2006/0205972 | A1 | 9/2006 | Clymo et al. | JP | 2001-131116 | 5/2001 |
| 2007/0112154 | A1 | 5/2007 | Lee et al. | JP | 2005-230585 | 9/2005 |
| 2007/0129512 | A1 | 6/2007 | Blitz et al. | WO | WO-98/52904 | 11/1998 |
| 2007/0299226 | A1 | 12/2007 | Park et al. | WO | WO-2006/020787 | 2/2006 |
| 2010/0113692 | A1 | 5/2010 | McGuire et al. | | | |
| 2010/0267855 | A1 | 10/2010 | McGuire, Jr. | | | |

FOREIGN PATENT DOCUMENTS

| | | |
|---|---|---|
| DE | 4344358 | 7/1995 |
| DE | 10036879 | 9/2001 |

* cited by examiner

METHOD AND APPARATUS FOR CONTINUOUS PRODUCTION OF PARTIALLY POLYMERIZED COMPOSITIONS AND POLYMERS THEREFROM

BACKGROUND OF THE INVENTION

The present invention relates generally to a method and apparatus for continuous production of partially polymerized compositions and polymers therefrom.

Polymers form the basis for many important materials. For example, adhesives are one important type of material typically based on polymers. Adhesives can be provided in various forms for application, often depending on how polymers on which they are based are themselves formed. For example, polymer-based adhesives can be prepared and provided in organic solvent for application, after which time the solvent is removed. Polymer-based adhesives can also be prepared and applied without use of organic solvent—for example, as in the case of hot-melt adhesives (i.e., where the adhesive is substantially polymerized prior to its application to a substrate) or web-polymerized adhesives (i.e., where the adhesive is substantially polymerized after its application to a substrate).

Methods for preparation of polymers and materials (e.g., adhesives) based thereupon can be performed in a continuous or batch-wise manner. In contrast to continuous web-polymerized methods, conventional methods of batch polymerization of adhesives and methods of continuous production of hot-melt adhesives typically involve running of an initial polymerization reaction to at least near complete conversion, and often complete conversion, of the monomer to polymer. In both cases, the adhesive is substantially polymerized prior to its application to a substrate as compared to web-polymerized adhesives (i.e., where the adhesive is substantially polymerized after its application to a substrate, as discussed above).

Nevertheless, in order for a polymerizable composition to be capable of forming and maintaining an adequate coating (i.e., a cohesive coating) for web-polymerization, it is known to be desirable to partially polymerize the composition before forming the coating on-web. See, for example, U.S. Pat. No. 6,866,899, for a discussion of partially polymerized syrup formation when coating a composition onto a substrate for polymerization. Although the web-polymerization itself may be a continuous process, formation of such a syrup is typically a batch process, with the syrup being prepared in a batch polymerization reactor. See, for example, U.S. Pat. Nos. 4,181,752 and 4,303,485. In addition to process inefficiencies inherent in batch processes as opposed to continuous processes, however, conventional batch processing has other disadvantages.

For example, U.S. Pat. No. 7,119,128 discusses the problem of achieving adequate distribution of free radicals generated by ultraviolet radiation throughout a batch polymerization reactor due to limited depth of penetration of ultraviolet radiation therein. In order to assist in overcoming this problem, stirrers and/or other equipment modifications are generally required to be used in such batch polymerization reactors.

U.S. Pat. No. 7,015,295 discusses the difficulty in adequately controlling batch polymerization reactions due to the large exotherm produced upon generation of free radicals when using thermal radiation. In order to assist in overcoming this problem, certain polymerization initiators and processing temperatures must be used according to the methods therein.

Thus, alternative processing methods for web-polymerization and formation of syrups for polymerization on-web are desirable. In addition to the need for alternative processing methods, a need for alternative processing equipment also exists.

While most conventional polymer processing equipment for continuous processes is configured to be substantially horizontal, it is known to utilize a vertical or elevated equipment configuration. German Patent No. 880938 discloses a method of continuous emulsion or suspension polymerization where a vertical tube with partial or continuous agitation is utilized for the select polymerization reactions therein.

U.S. Pat. No. 4,089,918 describes a process for the continuous casting of liquid polymerizable compositions. The compositions are polymerized via thermal polymerization. According to the process described therein, monomer is first partially polymerized and then further polymerized to a degree of polymerization of about 40-60% between a pair of moving belts. The path of the moving belts from a point where the polymerizable composition is inserted therebetween may be straight in a horizontal direction, inclined at a suitable angle to the horizontal, or curved to follow a natural curvature that may be defined by the moving belts when arranged so as to be inclined at a suitable angle to the horizontal.

Nevertheless, in view of environmental and safety concerns as well as the ever-present desire to optimize production efficiency, alternative methods and apparatus for production of further partially polymerized compositions, such as those on which many adhesives are based, are desirable. Particularly desired are alternative methods and apparatus for the continuous production of partially polymerized compositions as well as polymers therefrom.

BRIEF SUMMARY OF THE INVENTION

A method for continuous production of a partially polymerized composition according to the invention comprises: providing an angled plane; continuously providing polymerizable composition comprising one or more monomers to the angled plane at an elevated position thereon; irradiating the polymerizable composition to form the partially polymerized composition; and continuously removing the partially polymerized composition from the angled plane at a lower position thereon, wherein the angle of the angled plane facilitates free flow of polymerizing composition from the elevated position to the lower position.

Similarly, an apparatus for continuous production of a partially polymerized composition according to the invention comprises: an angled plane; an elevated position on the angled plane for continuous receipt of polymerizable composition comprising one or more monomers; at least one radiation source for irradiating the polymerizable composition to form the partially polymerized composition; and a lower position on the angled plane for continuous removal of the partially polymerized composition from the angled plane, wherein the angle of the angled plane facilitates free flow of polymerizing composition from the elevated position to the lower position.

Advantageously, according to preferred embodiments of methods and apparatus of the invention, polymerizing composition undergoes free flow from the elevated position to the lower position of the angled plane. In one embodiment, angle of the angled plane is about 5 degrees to about 90 degrees to horizontal. In a further embodiment, angle of the angled plane is about 20 degrees to about 70 degrees to horizontal. In yet a further embodiment, angle of the angled plane is about 30 degrees to about 60 degrees to horizontal. The angled plane may comprise one or more individual angled sections.

In a further embodiment, methods and apparatus of the invention further comprises providing an upper plate for sandwiching polymerizing composition between the angled plane and the upper plate.

A variety of polymerization mechanisms can be adapted according to the invention. In one embodiment, continuous polymerization of the polymerizable composition proceeds via a free radical mechanism. Partial polymerization can be effected by irradiation of the polymerizable composition using, for example, ultraviolet radiation and/or thermal radiation. In one embodiment, the polymerizing composition is irradiated through at least the angled plane. In another embodiment, the polymerizing composition is irradiated through at least the upper plate.

The partially polymerized composition may comprise a variety of chemistries. In an exemplary embodiment, the partially polymerized composition comprises (meth)acrylate syrup. No matter what type of chemistry comprises the partially polymerized composition, advantageously methods of the invention are essentially solvent-free in preferred embodiments.

According to a further embodiment of the invention, the invention further comprises continuously forming at least one of the one or more monomers to be partially polymerized from one or more precursors thereof. The partially polymerized composition is then formed to the desired percent monomer conversion. In an exemplary embodiment, partially polymerized composition according to the invention comprises about 5% to about 25% monomer conversion.

DETAILED DESCRIPTION OF THE INVENTION

Figure 1A:
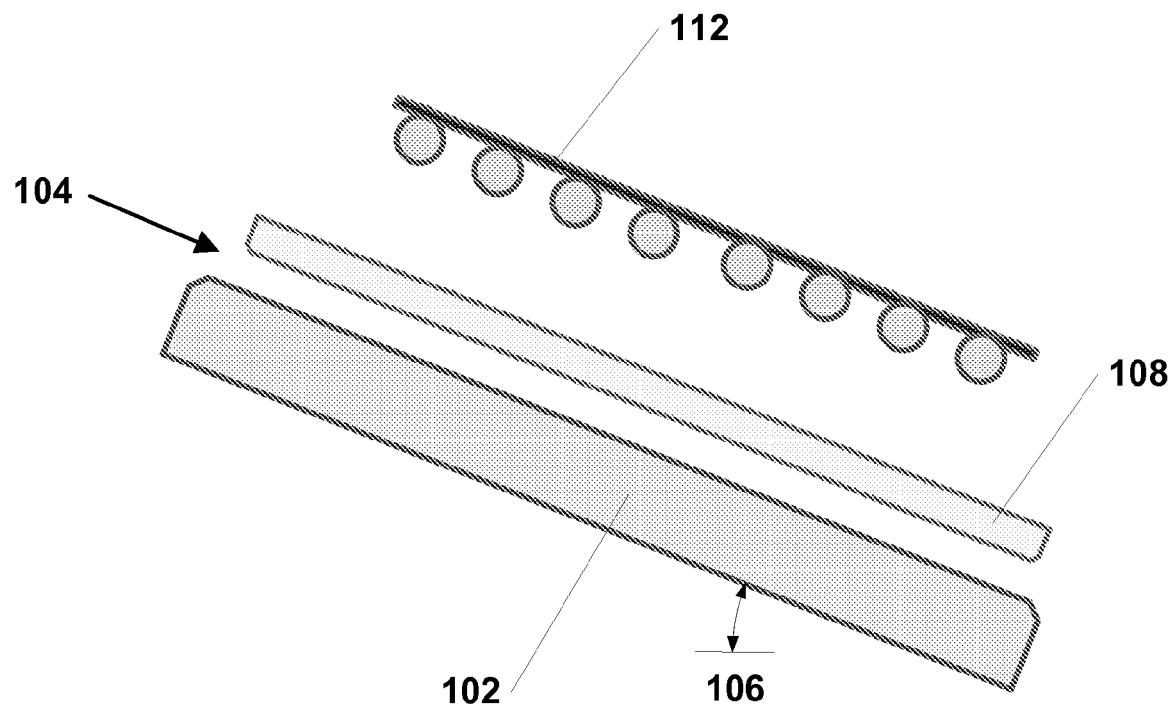
FIG. 1A is a schematic representation of one embodiment of an angled plane and associated apparatus for continuous production of partially polymerized compositions according to the present invention, wherein partial polymerization occurs between two plates.

The present invention relates to a method and apparatus for continuous production of partially polymerized compositions and, optionally, polymers therefrom. Partial polymerization occurs according to the invention using apparatus comprising an angled plane. According to the invention, a polymerizable composition flows onto the angled plane at an elevated position, flows downward along the plane during partial polymerization thereof, and then exits as a syrup at a lower position on the angled plane.

The present specification makes reference to terms that are described below for convenience of the reader.

As used herein, "(meth)acrylate" refers to both methacrylate and acrylate.

As used herein, "(meth)acrylic acid" refers to both methacrylic acid and acrylic acid.

As used herein, "continuous" refers to a process that is essentially uninterrupted in time and space from a beginning reference point to an ending reference point. In an exemplary embodiment, continuous processes enabled by apparatus of the invention have a beginning reference point corresponding to the point at which monomer is provided to the apparatus for at least partial polymerization and an ending reference point that is no earlier in the process than the point at which a partially polymerized composition, such as a (meth)acrylate syrup, is formed therefrom.

As used herein, "syrup" refers to a partially polymerized composition comprising a mixture of at least one monomer and the polymerization product thereof.

As used herein, "complete conversion" means about 100% of the stoichiometric amount of reactants are reacted, or converted, into their reaction product (i.e., polymer). This percentage of available reactants does not include amounts exceeding stoichiometric quantities of any of the reactants necessary to produce the polymer under the reaction conditions.

As used herein, "near complete conversion" means at least about 90% of the stoichiometric amount of reactants are reacted, or converted, into their reaction product (i.e., polymer). This percentage of available reactants does not include amounts exceeding stoichiometric quantities of any of the reactants necessary to produce the polymer under the reaction conditions.

As used herein, "essentially solvent-free" refers to compositions and associated methods comprising no more than about 5% organic solvents or water, more typically no more than about 3% organic solvents or water. Most typically, such systems are completely free of organic solvents and water.

According to the invention, a polymerizable composition (hereinafter interchangeably referred to as "monomer" for simplicity, whether or not the composition is partially polymerized to a degree) is provided to apparatus of the invention for at least partial polymerization thereof. Any suitable monomer can be used according to the invention. Many stock monomers are readily available from commercial suppliers. Monomer can also be prepared for use in the present invention using methodology known to those of ordinary skill in the art.

In one embodiment of the invention, unlike conventional methods and associated apparatus for polymerization of stock monomers, methods and apparatus of the invention facilitate continuous processing beginning with formation of at least one monomer from precursors thereof as described in copending U.S. patent application Ser. No. 12/264,602, entitled "Method For Continuous Production Of (Meth)Acrylate Syrup And Adhesives Therefrom." Any suitable chemistries and associated precursors can be used to form the monomer or combinations thereof. According to this embodiment, once formed, monomer continues to be processed to a partially polymerized composition in apparatus and according to methodology of the present invention.

In contrast to conventional batch and many continuous polymerization techniques and apparatus, continuous polymerization of monomer does not proceed to complete conversion during partial polymerization thereof when using apparatus according to the invention. Partial polymerization proceeds to the point at which syrup of the desired viscosity is obtained. In part due to configuration of apparatus for partial polymerization according to the invention, polymerization reactions therein are halted at a point prior to complete conversion, and even at a point prior to near complete conversion, of the monomer. Preferably, the polymerization reaction is halted at a point prior to 90% conversion, more preferably at a point prior to 70% conversion, even more preferably at a point corresponding to less than about 45% conversion, yet even more preferably at a point corresponding to about 5% to about 25% conversion, and still even more preferably at a point corresponding to about 5% to about 15% conversion, of the monomer based on molar weight of the monomer. In an exemplary embodiment, desired viscosity of the partially polymerized composition is that viscosity at which the syrup is readily able to flow onto and form a stable coating on a substrate—i.e., a coatable viscosity. Apparatus of the invention are preferably flexibly adapted to accommodate desired results in that regard.

According to one embodiment of the invention, a partially polymerized composition (e.g., (meth)acrylate syrup) comprising a coatable viscosity (i.e., a coatable composition) is capable of being formed continuously and, thus, efficiently. In order to form a cohesive coating, a coatable composition generally must have a sufficiently high viscosity. Yet, it is also important that the coatable composition has a low enough viscosity so that it can readily flow through the partial polymerization apparatus and onto a substrate upon coating. In an exemplary embodiment, coatable compositions formed according to the invention have a Brookfield viscosity of about 0.2 Pascal-second (200 centipoise) to about 10 Pascal-seconds (10,000 centipoise) when measured at room temperature. A composition's Brookfield viscosity is measurable using equipment and according to methodology known to those of ordinary skill in the art. For example, a rotational viscometer such as those available from Cole-Parmer (Vernon Hills, Ill.) can be used to measure a composition's Brookfield viscosity.

In one embodiment, coatable compositions formed according to the invention have a Brookfield viscosity of about 5 Pascal-seconds (5,000 centipoise) or less when measured at room temperature. In another embodiment, coatable compositions formed according to the invention have a Brookfield viscosity of about 4 Pascal-seconds (4,000 centipoise) or less when measured at room temperature. For example, coatable compositions formed according to the invention can have a Brookfield viscosity of about 0.5 Pascal-second (500 centipoise) to about 5 Pascal-seconds (5,000 centipoise) when measured at room temperature. As yet another example, coatable compositions formed according to the invention can have a Brookfield viscosity of about 1 Pascal-second (1,000 centipoise) to about 3 Pascal-seconds (3,000 centipoise) when measured at room temperature.

Partial polymerization of the monomer to form the coatable composition can be effected using any suitable polymerization mechanism. Exemplary polymerization mechanisms include free radical polymerization, anionic polymerization, and cationic polymerization. Depending on the type of monomer and polymerization mechanism, polymerization initiators may be desired or required. Polymerization initiators are also selected, in part, based on the energy source to be used during polymerization. Any suitable energy source can be used according to the invention. Exemplary energy sources include actinic radiation (e.g., ultraviolet radiation or e-beam) and thermal radiation sources. Any polymerization initiators used can be mixed with the monomer prior to or during the partial polymerization thereof as known to those skilled in the art in order to effectuate the desired polymerization.

In addition to polymerization initiators, other suitable additives can be included in the polymerizable composition as desired and selected in types and amounts as known to those skilled in the art. According to the invention, however, preferably the partial polymerization proceeds in an essentially solvent-free manner. Advantageously, the absence of solvents (i.e., both organic solvents and water) allows smaller and less costly reaction equipment to be used for that stage. In contrast, as discussed in the background of the invention above, safety mandates that relatively large and specially designed reaction equipment be utilized for conventional solvent-based batch polymerization in order to accommodate the large reaction exotherm and solvents. The solvents must also then be removed, which negatively impacts process efficiency.

In an exemplary embodiment, partial polymerization according to the invention proceeds via free radical polymerization initiated using a radiation source, such as an ultraviolet energy radiation source. The amount and intensity of irradiation from the radiation source is adjusted according to the knowledge of those of ordinary skill in the art to obtain the desired resulting polymer properties. The spectral distribution of the radiation together with the rate of irradiation is known to substantially control the rate of polymerization. The rate of polymerization, in turn, determines the molecular weight of the resulting polymer. The molecular weight of the polymer and the choice of the monomers are among the factors that ultimately determine the resulting polymer's properties.

As noted above and with reference to FIG. 1A, monomer flows onto an angled plane 102 at an elevated position in partial polymerization apparatus of the invention. Then, the monomer flows downward in direction 104 along the angled plane 102 during partial polymerization thereof, after which time it departs as a syrup at a lower position on the angled plane 102. An optional upper plate 108 and radiation source comprising an ultraviolet light bank 112, both further described below, are also illustrated in FIG. 1A.

Angle 106 of the angled plane 102 is selected according to, amongst other considerations: length of the angled plane 102; whether the angled plane 102 comprises one or more individual angled sections 114, 118; and, the length of each angled section 114, 118. Preferably, angle 106 of the angled plane 102 is one that facilitates free flow (i.e., flow without application of non-gravitational force, such as that supplied by mechanical rollers, belts, and the like) of the polymerizing composition from the elevated position to the lower position and at the rate necessary to obtain desired properties in the resulting polymer. The angled plane 102 is also preferably smooth and planar to promote free flow thereon.

In an exemplary embodiment, angle 106 is about 5 degrees to about 90 degrees to horizontal. In a further embodiment, angle 106 is about 10 degrees to about 75 degrees to horizontal. In yet a further embodiment, angle 106 is about 20 degrees to about 70 degrees to horizontal. In still a further embodiment, angle 106 is about 30 degrees to about 60 degrees to horizontal.

Advantageously, providing an angled plane 102 according to the invention facilitates controlled free flow of monomer thereon during partial polymerization thereof. Thus, the invention advantageously eliminates the need for costly and/or complicated apparatus otherwise required to promote adequate conveyance of polymerizing composition along the angled plane 102. To accommodate different applications, in a preferred embodiment the angle 106 of the angled plane 102 is readily adjustable during or between uses of the apparatus. It is also to be understood that the angled plane 102 may comprise multiple angled sections of varying individual section angles.

Figure 1B:
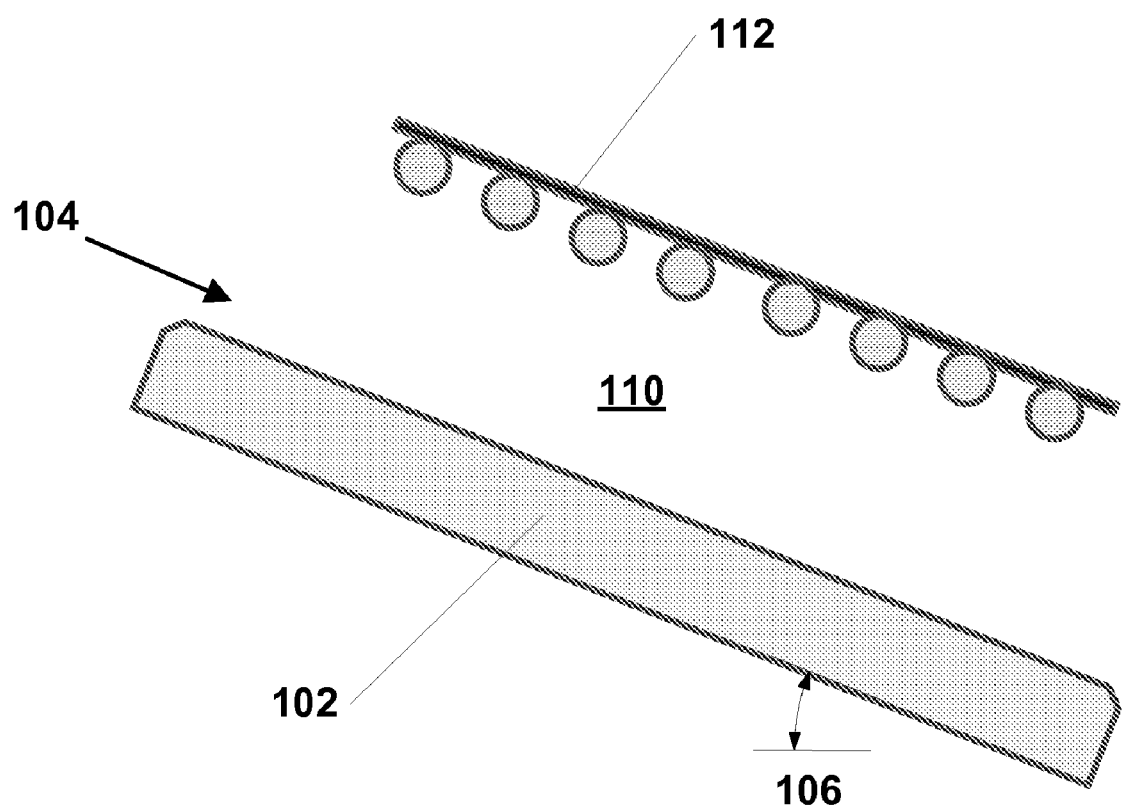
FIG. 1B is a schematic representation of another embodiment of an angled plane and associated apparatus for continuous production of partially polymerized compositions according to the present invention, wherein partial polymerization occurs on the angled plane without the presence of an upper plate on the polymerizing composition.
Figure 1C:
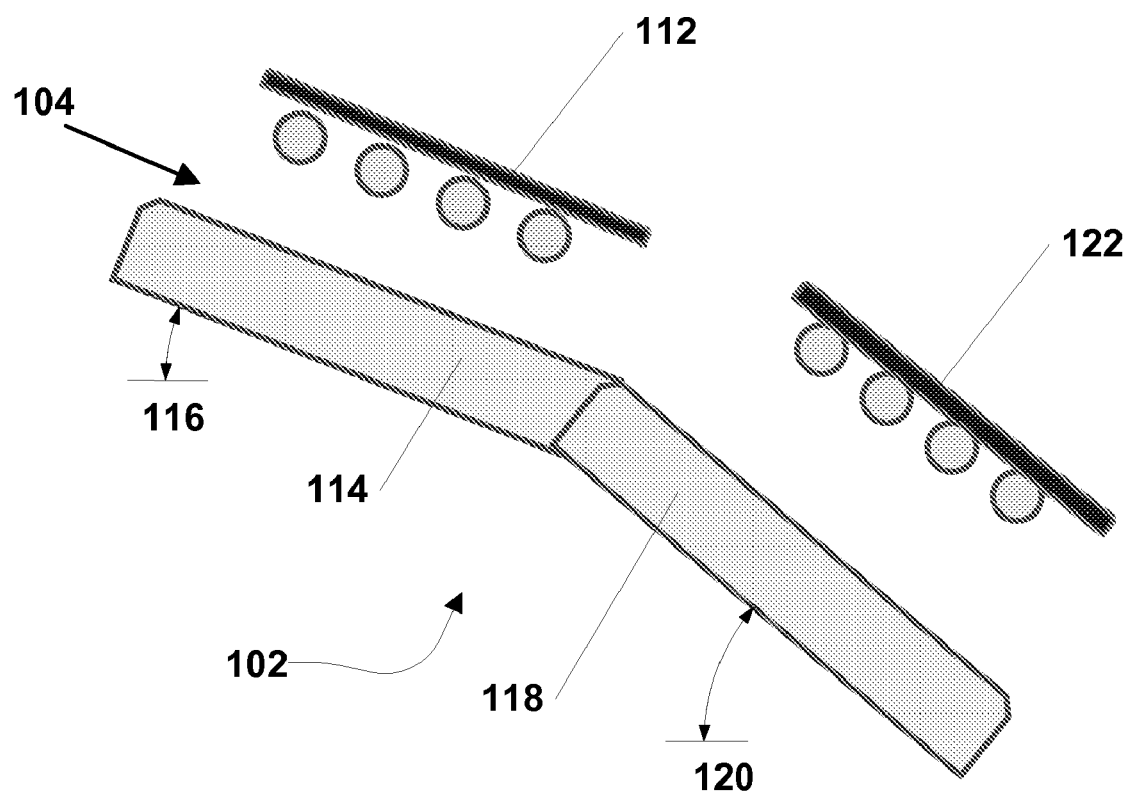
FIG. 1C is a schematic representation of yet another embodiment of an angled plane and associated apparatus for continuous production of partially polymerized compositions according to the present invention, wherein partial polymerization occurs on an angled plane comprising multiple discontinuous plates.

That is, in all embodiments, the plate comprising angled plane 102 may itself comprise one or more individual plates or layers. As illustrated in FIGS. 1A-1B, the angled plane 102 is essentially one continuous plate. Alternatively, as illustrated in FIG. 1C, the angled plane 102 is discontinuous, comprising multiple angled sections. First angled section 114 of the angled plane 102 has a first length and first angle 116 with respect to horizontal. Second angled section 118 of the angled plane 102 has a second length and second angle 120 with respect to horizontal. While two angled sections 114 and 118 are illustrated in FIG. 1C, more than two angled sections may be present in further embodiments of the invention. While angles 116, 120 of individual angled sections 114, 118 may all vary in such embodiments, understand that two or more individual angled sections 114, 118 in an angled plane 102 comprising multiple angled sections may comprise the same angle 116, 120.

From an alternative perspective, dimensions (e.g., length and width) of the angled plane 102 are selected such that polymerizing composition flows from the elevated position to the lower position of the angled plane 102 at the desired flow rate. Flow rate generally has a material mass component and a time component. Among other possible factors relevant to flow rate, length, width and thickness of the polymerizing composition correspond to the material mass flow rate component. Likewise, among other possible factors relevant to flow rate, angle 106 and viscosity of the polymerizing composition correspond to the time flow rate component.

Thickness of the polymerizing composition is generally dependent on and/or adjusted based on chemistry of the polymerizable composition; the degree of partial polymerization (i.e., percent conversion) desired; the type of radiation used to initiate polymerization of the polymerizable composition; and, properties desired in the resulting material. In an exemplary embodiment of the invention, thickness of the polymerizing composition does not significantly impact flow rate thereof.

Generally to a much greater extent according to an exemplary embodiment of the invention, flow rate is dependent on, among other factors (e.g., angle 106), aspect ratio of the polymerizing composition. It is to be understood that "aspect ratio" of the polymerizing composition is the ratio of a film of the polymerizing composition's longest dimension to its next longest dimension. While aspect ratio is defined in terms of dimensions of the polymerizing composition, it is to be understood that dimensions of the polymerizing composition are related to dimensions of the angled plane 102. For example, length of the angled plane 102 approximates length of the polymerizing composition downward along the angled plane 102 and width of the angled plane 102 is at least the width of the polymerizing composition.

In one embodiment, aspect ratio of the polymerizing composition is the ratio of its length to its width. Aspect ratio of the angled plane 102 (and any individual angled sections 114, 118 of the angled plane 102 when it is discontinuous according to further embodiments) is selected according to, amongst other considerations, the angle 106 of the angled plane 102; whether the angled plane 102 comprises one or more individual angled sections 114, 118; the length of each individual angled section 114, 118; the width of each individual angled section 114, 118; and, the angle 116, 120 of each angled section 114, 118.

In an exemplary embodiment, aspect ratio of the polymerizing composition is about 1:1 to about 100:1. In a further embodiment, aspect ratio of the polymerizing composition is about 2:1 to about 50:1. In yet a further embodiment, aspect ratio of the polymerizing composition is about 3:1 to about 25:1.

In one embodiment, partial polymerization is carried out in the absence of air and oxygen (which can inhibit the polymerization reaction). When an inert environment is necessary to effect desired partial polymerization (e.g., when the polymerization mechanism is free radical polymerization as opposed to anionic or cationic polymerization), any suitable mechanism for effecting the inert environment can be used as known to those of ordinary skill in the art. In general, any suitable method for creating an inert environment can be used according to the invention.

In one such embodiment, as also illustrated in FIG. 1A, an inert environment is effected in a portion of the partial polymerization apparatus by sandwiching monomer between two plates—e.g., the angled plane 102 and an upper plate 108—having a relatively small gap therebetween. It is to be understood that each of the two plates 102, 108 may comprise one or more individual plates or layers. Further, the plates 102, 108, which are preferably solid, can be the same or different with respect to the type of material from which they are made and/or their dimensions. While not required, in a further embodiment, the plates 102, 108 or separate side plates (not shown) are configured to also enclose the relatively small gap between sides of the plates 102, 108.

Partial polymerization is effected by irradiating monomer, which flows in direction 104 along angled plane 102, from an elevated position to a lower position thereon, through one or both of the plates 102, 108. Monomer is irradiated as such using a suitable radiation source, for example, an ultraviolet bulb bank 112.

In another embodiment for partially polymerizing in an inert environment, the partial polymerization apparatus is operated within a larger, inert reaction chamber to form an inert environment for partial polymerization. In another such embodiment, an inert environment is effected in a portion of the partial polymerization apparatus by creating a localized inert space 110 over the monomer being partially polymerized on the angled plane 102. In both of these embodiments, as generally illustrated in FIG. 1B, monomer flows in direction 104 along angled plane 102, from an elevated position to a lower position thereon, without being sandwiched by an upper plate.

In an exemplary embodiment, any plate positioned between the radiation source and monomer being partially polymerized on the angled plane 102, such as upper plate 108 illustrated in FIG. 1A, is selected to be of the type facilitating transmission of radiation from the radiation source therethrough. In one embodiment, any suitable transparent or translucent material can be used for any plate positioned between an ultraviolet radiation source and monomer being partially polymerized on the angled plane 102 to allow transmission of ultraviolet radiation therethrough. A wide variety of transparent and translucent materials are known and suitable for this purpose, including many types of glass and plastic. In another embodiment, any plate positioned between a thermal radiation source and monomer being partially polymerized on the angled plane 102 facilitates transmission of thermal radiation therethrough. A wide variety of thermally conductive materials are suitable for this purpose, including most commonly those based on metal.

Figure 1D:
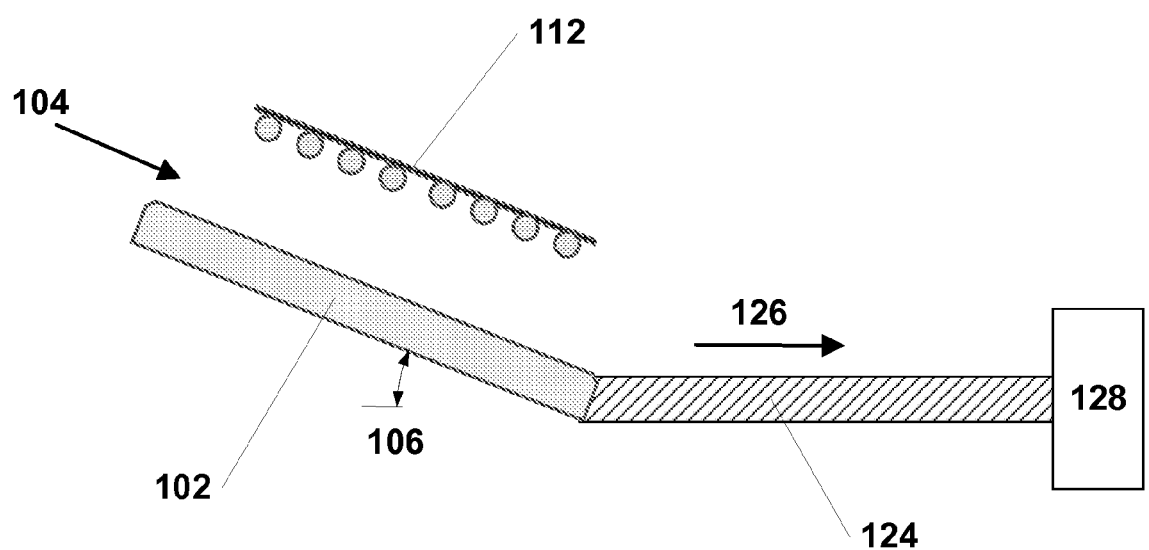
FIG. 1D is a schematic representation of a further embodiment of an angled plane and associated apparatus for continuous production of partially polymerized compositions according to the present invention, wherein the partially polymerized composition departs the angled plane and continues onto a moving web for further polymerization.
Figure 1E:
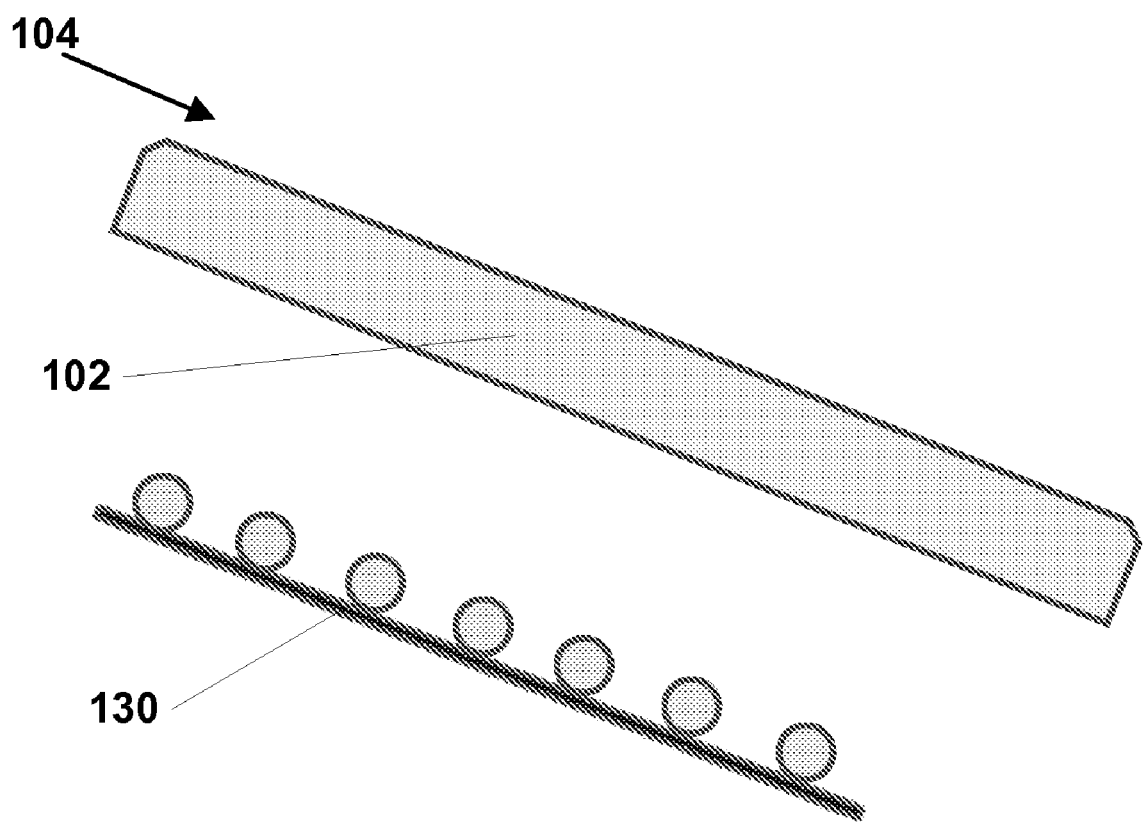
FIG. 1E is a schematic representation of another embodiment of an angled plane and associated apparatus for continuous production of partially polymerized compositions according to the present invention, wherein polymerizing composition is irradiated through the angled plane.
Figure 1F:
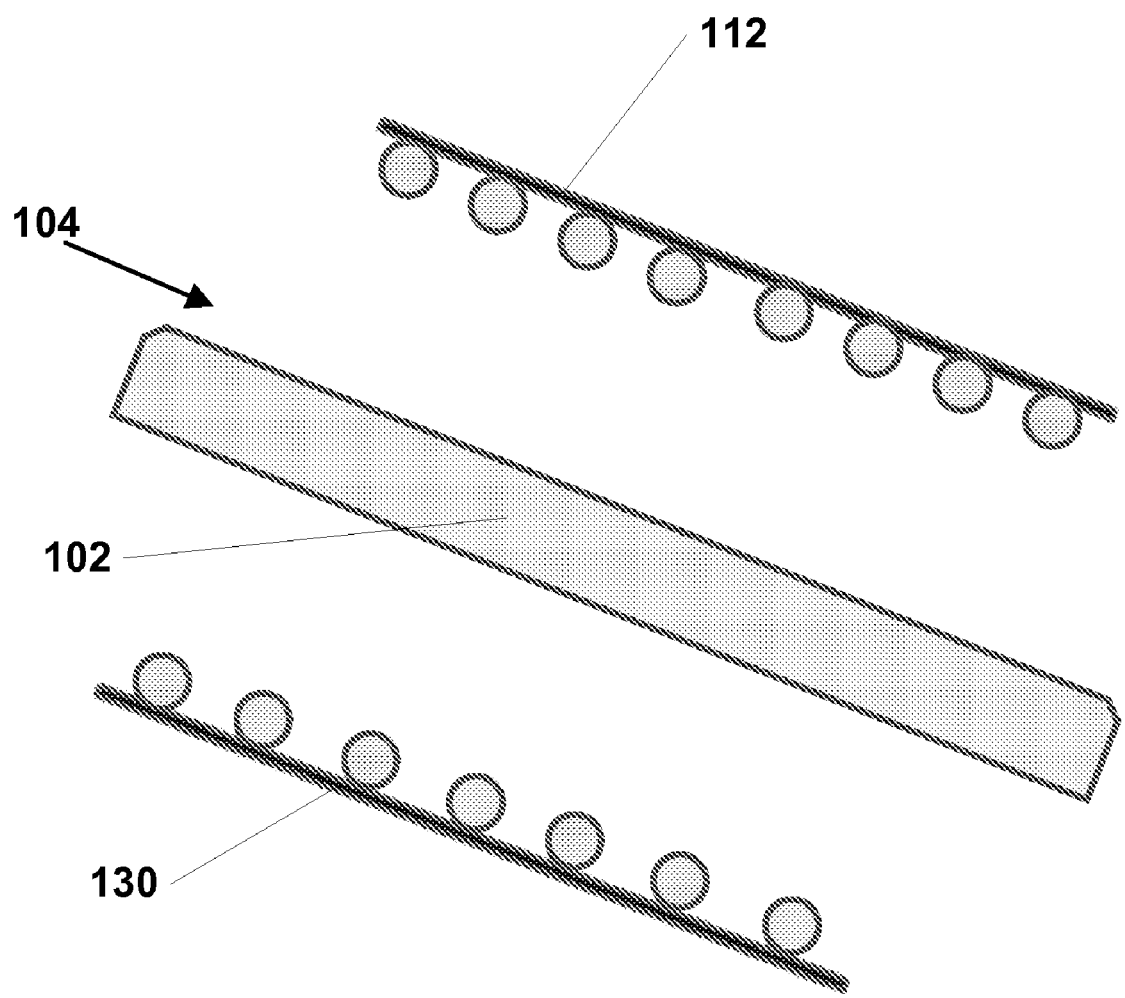
FIG. 1F is a schematic representation of yet another embodiment of an angled plane and associated apparatus for continuous production of partially polymerized compositions according to the present invention, wherein partial polymerization occurs between two plates and polymerizing composition is irradiated through the angled plane and an upper plate.

While the radiation source is illustrated above the angled plane 102 in FIGS. 1A-1D, it is to be understood that the radiation source can be positioned below the angled plane 102 or in other suitable locations as known to those of ordinary skill in the art and depending on the type of polymerization, chemistry of the polymerizable composition, type of plate(s) in the apparatus, and other similar factors. One such embodiment is illustrated in FIG. 1E, where a radiation source comprising an ultraviolet light bank 130 is positioned below the angled plane 102 for irradiation of polymerization composition therethrough. A further embodiment is illustrated in FIG. 1F, wherein the radiation source comprising an ultraviolet light bank 130 is positioned below the angled plane 102 and the radiation source comprising an ultraviolet light bank 112 is also positioned above the angled plane 102.

In an exemplary embodiment, as compared to batch polymerization techniques and associated apparatus, apparatus facilitating continuous methods according to the invention enable efficient formation of a partially polymerized composition by exposing only a relatively small volume of material at a time to reaction conditions during the partial polymerization. This relatively short and low volume reaction advantageously enables a more controlled reaction product and safer reaction conditions, particularly in view of the highly exothermic nature of, for example, the free radically initiated (meth)acrylate polymerization reaction.

Once the partially polymerized composition is formed, it can be stored for later processing or continuously supplied to further processing equipment for additional continuous processing as known to those skilled in the art. As illustrated in FIG. 1D, partially polymerized composition flows from the angled plane 102 onto a web 124 moving in direction 126 for further polymerization on-web. The further polymerized composition exits the web 124 to apparatus 128 for further processing and/or storage.

Process efficiency is optimized when partially polymerized composition flows from the angled plane 102 onto the web 118 for complete, or near complete, conversion of monomer to the desired polymer. Advantageously, apparatus and methods of the invention enable continuous processing of monomer through at least partial polymerization thereof—and from a point prior to formation of the monomer and/or to a point corresponding to formation of polymers from the monomer in further embodiments.

Exemplary embodiments and applications of apparatus of the invention are described in the following non-limiting examples.

EXAMPLES

Example 1

First, 90 parts by weight iso-octyl acrylate and 10 parts by weight acrylic acid were mixed to form a monomer mixture. Then, 0.1% photoinitiator (IRGACURE 819, a bis-acylphosphine oxide photoinitiator with a maximum absorption in the range of about 360-390 nanometers, available from Ciba Specialty Chemicals Inc. of Tarrytown, N.Y.) based on weight of the monomer mixture was added to form a polymerizable composition.

Then, two glass plates, each measuring 30 cm×38 cm (12 inches×15 inches), separated by a gap of 1.5 mm (60 mils) were laid out at an angle of 45° to horizontal, the bottom plate comprising an angled plane according to the invention. Above the glass plates, a bank of BLC bulbs were provided at a sufficient intensity (400-450 mJ/cm$^2$, as measured using a UV Map Plus from Electronic Instrumentation & Technology, Inc. of Sterling, Va.) to partially polymerize the polymerizable composition.

To begin polymerization, the gap between the glass plates was inerted using nitrogen. The polymerizable composition was then fed into the inerted gap at a rate of about 20 kg/hr. Upon entering the gap, the composition was allowed to freely flow between the glass plates and partially polymerize, exiting the glass plates with a Brookfield viscosity of about 2,500 cPs (2.5 mPa·sec).

Various modifications and alterations of the invention will become apparent to those skilled in the art without departing from the spirit and scope of the invention, which is defined by the accompanying claims. It should be noted that steps and stages recited in any method claims below do not necessarily need to be performed in the order that they are recited. Those of ordinary skill in the art will recognize variations in performing the steps and stages from the order in which they are recited. In addition, the lack of mention or discussion of a feature, step, stage, or component provides the basis for claims where the absent feature or component is excluded by way of a proviso or similar claim language.

Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention.

In addition, as discussed herein it is again noted that the compositions described herein may comprise all components in one or multiple parts. Other variations are recognizable to those of ordinary skill in the art.

The invention claimed is:

1. A method for continuous production of a partially polymerized composition, comprising:
   providing an angled plane;
   continuously providing polymerizable composition comprising one or more monomers to the angled plane at an elevated position thereon;
   irradiating the polymerizable composition to form the partially polymerized composition; and
   continuously removing the partially polymerized composition from the angled plane at a lower position thereon,
   wherein the angle of the angled plane facilitates free flow of polymerizing composition from the elevated position to the lower position, and
   wherein the method is essentially solvent-free.

2. The method of claim 1, further comprising providing an upper plate for sandwiching polymerizing composition between the angled plane and the upper plate.

3. The method of claim 1, wherein the step of continuously providing polymerizable composition comprising one or more monomers to the angled plane at an elevated position thereon comprises continuously forming at least one of the one or more monomers from one or more precursors thereof.

4. The method of claim 1, wherein the partially polymerized composition comprises (meth)acrylate syrup.

5. The method of claim 1, wherein the partially polymerized composition comprises about 5% to about 25% monomer conversion.

6. A method for continuous production of a partially polymerized composition, comprising:
- continuously forming at least one monomer from one or more precursors thereof;
- providing an angled plane;
- continuously providing polymerizable composition comprising the at least one monomer to the angled plane at an elevated position thereon;
- irradiating the polymerizable composition to form the partially polymerized composition; and
- continuously removing the partially polymerized composition from the angled plane at a lower position thereon,
- wherein the angle of the angled plane facilitates free flow of polymerizing composition from the elevated position to the lower position.

7. The method of claim 1, wherein continuous polymerization of the polymerizable composition proceeds via a free radical mechanism.

8. The method of claim 1, wherein the polymerizable composition is irradiated using ultraviolet radiation.

9. The method of claim 1, wherein the polymerizable composition is irradiated using thermal radiation.

10. The method of claim 1, wherein the angle of the angled plane is about 5 degrees to about 90 degrees to horizontal.

11. The method of claim 1, wherein the angle of the angled plane is about 20 degrees to about 70 degrees to horizontal.

12. The method of claim 1, wherein the angle of the angled plane is about 30 degrees to about 60 degrees to horizontal.

13. The method of claim 1, wherein the angled plane comprises one or more individual angled sections.

14. The method of claim 1, wherein the polymerizing composition undergoes free flow from the elevated position to the lower position.

15. The method of claim 1, wherein the polymerizing composition is irradiated through at least the angled plane.

16. The method of claim 2, wherein the polymerizing composition is irradiated through at least the upper plate.

17. The method of claim 6, wherein the method is essentially solvent-free.

18. The method of claim 6, further comprising providing an upper plate for sandwiching polymerizing composition between the angled plane and the upper plate.

19. The method of claim 6, wherein the partially polymerized composition comprises (meth)acrylate syrup.

20. The method of claim 6, wherein the partially polymerized composition comprises about 5% to about 25% monomer conversion.

21. The method of claim 6, wherein continuous polymerization of the polymerizable composition proceeds via a free radical mechanism.

22. The method of claim 6, wherein the polymerizable composition is irradiated using ultraviolet radiation.

23. The method of claim 6, wherein the polymerizable composition is irradiated using thermal radiation.

24. The method of claim 6, wherein the angle of the angled plane is about 5 degrees to about 90 degrees to horizontal.

25. The method of claim 6, wherein the angle of the angled plane is about 20 degrees to about 70 degrees to horizontal.

26. The method of claim 6, wherein the angle of the angled plane is about 30 degrees to about 60 degrees to horizontal.

27. The method of claim 6, wherein the angled plane comprises one or more individual angled sections.

28. The method of claim 6, wherein the polymerizing composition undergoes free flow from the elevated position to the lower position.

29. A method for continuous production of a partially polymerized composition, comprising:
- continuously forming at least one monomer from one or more precursors thereof;
- providing an angled plane;
- continuously providing polymerizable composition comprising the at least one monomer to the angled plane at an elevated position thereon;
- irradiating the polymerizable composition through at least the angled plane to form the partially polymerized composition; and
- continuously removing the partially polymerized composition from the angled plane at a lower position thereon,
- wherein the angle of the angled plane facilitates free flow of polymerizing composition from the elevated position to the lower position.

30. The method of claim 6, wherein the polymerizing composition is irradiated through at least the upper plate.

* * * * *